United States Patent Office 3,481,942
Patented Dec. 2, 1969

3,481,942
OXA-DIAZASPIRO[4.5]DECANE COMPOUNDS
Bernard Loev, Broomall, Pa., assignor to Smith Kline & French Laboratories, Philadelphia, Pa., a corporation of Pennsylvania
No Drawing. Continuation-in-part of application Ser. No. 622,885, Mar. 14, 1967. This application Sept. 6, 1968, Ser. No. 758,108
Int. Cl. C07d 29/16, 31/40, 29/34
U.S. Cl. 260—294.7                4 Claims

ABSTRACT OF THE DISCLOSURE

Spiro compounds prepared by reacting an α-aminoalkyl substituted methanol with an N-substituted piperidone have anoretic and antidepressant activity.

---

This application is a continuation-in-part of Ser. No. 622,885 filed Mar. 14, 1967, and now abandoned.

This invention relates to new oxa-diazaspiro[4.5]-decane compounds having pharmacodynamic activity, in particular having anoretic and antidepressant activity.

The anoretic activity is demonstrated by administration to dogs at doses of about 15 mg./kg. orally.

The antidepressant activity is demonstrated in a standard pharmacological procedure by prevention of reserpine induced ptosis in rats at doses of about 0.5–50 mg./kg. orally. This pharmacological property is characteristic of antidepressant agents such as imipramine.

The new compounds of this invention are represented by the following formula:

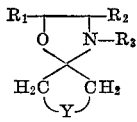

in which:

$R_1$ is phenyl, phenyl substituted by from one or two halo, hydroxy, lower alkyl or lower alkoxy substituents, trifluoromethylphenyl, cyanophenyl, methylenedioxyphenyl, pyridyl, furyl or thienyl;
$R_2$ is lower alkyl;
$R_3$ is hydrogen or lower alkyl;
Y is a saturated three membered chain comprising two $CH_2$ members and one $N$-$R_4$ member and
$R_4$ is lower alkyl or benzyl.

Advantageous compounds of this invention are represented by the above formula in which $R_1$ is phenyl, halophenyl, dihalophenyl, hydroxyphenyl, dihydroxyphenyl, tolyl, xylyl, methoxyphenyl, dimethoxyphenyl and methylenedioxyphenyl, $R_2$ is methyl or ethyl, $R_3$ is hydrogen, methyl or ethyl, Y is

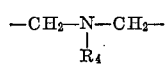

and $R_4$ is lower alkyl, preferably, methyl.

A preferred compound of this invention is 3,8-dimethyl-2-phenyl-1-oxa-4,8-diazaspiro[4.5]decane which is represented by the above formula in which $R_1$ is phenyl, $R_2$ is methyl, $R_3$ is hydrogen and Y is

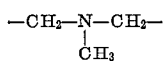

The compounds of this invention are prepared by the following procedure:

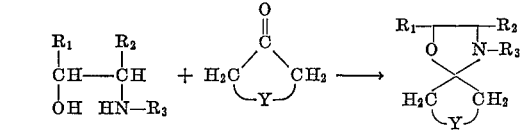

The terms $R_1$, $R_2$, $R_3$ and Y are as defined above.

According to the above procedure an α-aminoalkyl substituted methanol is reacted with an N-substituted piperidone. The reaction is preferably carried out in an inert solvent such as a hydrocarbon, for example, benzene or toluene, at elevated temperature. Advantageously, water is removed during the reaction by using an azeotroping device or a drying agent such as magnesium sulfate or molecular sieve. Optionally, an acid catalyst, such as methane sulfonic acid, toluene sulfonic acid or a strong acid ion exchange resin, may be employed, in particular when an azeotroping device is used.

The α-aminoalkyl substituted methanol starting materials are either known to the art or are prepared by the following procedure:

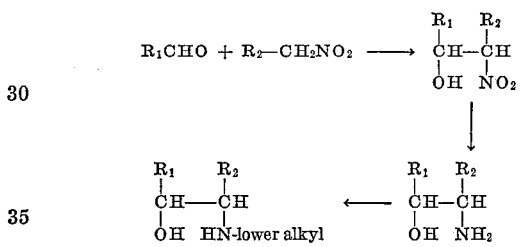

The terms $R_1$ and $R_2$ are as defined above.

According to the above procedure, a carboxaldehyde is condensed with a nitroalkane in the presence of a basic condensing agent such as a sodium methoxide in a solvent such as methanol. Treating with acid such as dilute acetic acid gives the α-nitroalkyl substituted methanol. This nitro alcohol is reduced, for example with lithium aluminum hydride in tetrahydrofuran, to give the α-primary aminoalkyl substituted methanol starting material. Alkylation of the primary amino compounds by, for example, reacting with a lower alkyl halide or with an acylating agent such as ethyl formate or acetyl chloride and reducing the resulting N-acyl amino alcohol with a reducing agent such as lithium aluminum hydride gives the α-mono-lower alkylaminoalkyl substituted methanol starting materials.

The compounds of this invention may exist in stereoisomeric forms, that is, as $d$ and $l$ optical isomers as well as $dl$ mixtures and as cis and trans isomers as well as cis-trans mixtures. It is intended that the general formulas presented herein include all of these stereoisomers, the separated isomers as well as the mixtures thereof. The isomers are conveniently prepared from the corresponding isomers of the α-aminoalkyl substituted methanol starting materials.

The terms "lower alkyl" and "lower alkoxy" where used herein denote groups having 1–4, preferably 1–2, carbon atoms.

The compounds of this invention may be combined with pharmaceutical carriers according to accepted pharmaceutical practices and administered internally in conventional dosage forms containing an appropriate dose of the compound.

The following examples are not limiting but are illustrative of this invention.

EXAMPLE 1

Ten grams of dry norephedrine is dissolved in 150 ml. of refluxing benzene. 1-methyl-4-piperidone (7.5 g.) is added and the resulting mixture is refluxed for about 3.5 hours, while removing water using an azeotroping device. The mixture is concentrated and distilled in vacuo to give cis - 3,8-dimethyl-2-phenyl-1-oxa-4,8-diazaspiro[4.5]decane.

EXAMPLE 2

By the procedure of Example 1, using 10.9 g. of *l*-pseudoephedrine in place of norephedrine the product is *l*-trans - 3,4,8-trimethyl - 2 - phenyl-1-oxo-4,8-diazaspiro [4.5]-decane.

Similarly, using *d*-ephedrine the product is *d*-cis-3,4,8-trimethyl-2-phenyl-1-oxa-4,8-diazaspiro[4.5]decane.

EXAMPLE 3

1-ethyl-4-piperidone (12.7 g.) is added to 19.7 g. of 3,4-dihydroxyephedrine in 250 ml. of benzene. The resulting mixture is heated at reflux for four hours while removing water. Concentrating in vacuo and recrystallizing the residue from ethanol-hexane gives 2-(3,4-dihydroxyphenyl) - 8-ethyl-3,4-dimethyl-1-oxa-4,8-diazaspiro [4.5]decane.

In the same manner, using 15.5 g. of 1-n-butyl-4-piperidone in place of 1-ethyl-4-piperidone, there is obtained 8 - n - butyl-2-(3,4-dihydroxyphenyl)-3,4-dimethyl-1-oxa-4,8-diazaspiro[4.5]decane.

EXAMPLE 4

1-methyl-3-piperidone (11.3 g.) is added to 15.1 g. of norephedrine in 225 ml. of benzene. The resulting mixture is refluxed for four hours while removing water, then worked up as in Example 1 to give 3,7-dimethyl-2-phenyl-1-oxa-4,7-diazaspiro[4.5]decane and 3,9-dimethyl-2-phenyl-1-oxa-4,9-diazaspiro[4.5]decane.

In the same manner using 18.9 g. of 1-benzyl-3-piperidone in place of 1-methyl-3-piperidone in the above procedure, 7 - benzyl-3-methyl-2-phenyl-1-oxa-4,7-diazaspiro [4.5]decane and 9-benzyl-3-methyl-2-phenyl-1-oxa-4,9-diazaspiro[4.5]decane are obtained.

EXAMPLE 5

By the procedure of Example 1, using in place of norephedrine 0.066 m. of each of the following:

p-Methoxyephedrine
p-Chloroephedrine
p-Fluoroephedrine
p-Methylephedrine
3,4-methylenedioxyephedrine
2,5-dischloroephedrine the following products are obtained, respectively:

2-(p-methoxyphenyl)-3,4,8-trimethyl-1-oxa-4,8-diazaspiro[4.5]decane
2-(p-chlorophenyl)-3,4,8-trimethyl-1-oxa-4,8-diazaspiro [4.5]decane
2-(p-fluorophenyl)-3,4,8-trimethyl-1-oxa-4,8-diazaspiro [4.5]decane
3,4,8-trimethyl-2-(p-tolyl)-1-oxa-4,8-diazaspiro[4.5] decane
3,4,8-trimethyl-2-(3,4-methylenedioxyphenyl)-1-oxa-4,8-diazaspiro[4.5]decane
2-(2,5-dichlorophenyl)-3,4,8-trimethyl-1-oxa-4,8-diazaspiro[4.5]decane.

EXAMPLE 6

To 12.0 g. of α-(1-ethylaminoethyl)-3,4-dimethoxybenzyl alcohol in 200 ml. of benzene is added 9.5 g. of 1-benzyl-4-piperidone and the resulting mixture is heated at reflux for five hours while removing water. Working up as in Example 1 gives 8-benzyl-2-(3,4-dimethoxyphenyl) - 4-ethyl-3-methyl-1-oxa-4,8-diazaspiro[4.5]decane.

By the same procedure, using 10.4 g. of α-[1-(n-butyl) aminoethyl]benzyl alcohol in 150 ml. of benzene and 6.7 g. of 1-methyl-4-piperidone the product is 4-(n-butyl)-3,8-dimethyl-2-phenyl-1-oxa-4,8-diazaspiro[4.5]decane.

EXAMPLE 7

By the procedure of Example 1, 0.066 m. of 1-methyl-4-piperidone is reacted with 0.066 m. of each of the following:

α-(1-aminoethyl)-p-bromobenzyl alcohol
α-(1-aminoethyl)-m-chlorobenzyl alcohol
α-(1-aminoethyl)-p-butylbenzyl alcohol
α-(1-aminoethyl)-2,5-dimethoxybenzyl alcohol
α-(1-aminoethyl)-3,4-dimethylbenzyl alcohol
α-(1-aminoethyl)-2-methoxy-5-methylbenzyl alcohol to give the following products, respectively:

2-(p-bromophenyl)-3,8-dimethyl-1-oxa-4,8-diazaspiro [4.5]decane
2-(m-chlorophenyl)-3,8-dimethyl-1-oxa-4,8-diazaspiro [4.5]decane
2-(p-butylphenyl)-3,8-dimethyl-1-oxa-4,8-diazaspiro [4.5]decane
2-(2,5-dimethoxyphenyl)-3,8-dimethyl-1-oxa-4,8-diazaspiro[4.5]decane
3,8-dimethyl-2-(3,4-xylyl)-1-oxa-4,8-diazaspiro[4.5] decane
2-(2-methoxy-5-methylphenyl)-3,8-dimethyl-1-oxa-4,8-diazaspiro[4.5]decane.

EXAMPLE 8

To 13.4 g. of α-(1-aminobutyl)-3,4-diethoxybenzyl alcohol in 200 ml. of benzene is added 6.4 g. of 1-ethyl-4-piperidone and the resulting mixture is heated at reflux for 3.5 hours while removing water. After working up as in Example 1, 2-(3,4-diethoxyphenyl)-8-ethyl-3-propyl-1-oxa-4,8-diazaspiro[4.5]-decane is obtained.

EXAMPLE 9

To 17.4 g. of p-trifluoromethylbenzaldehyde and 15 g. of nitroethane in 60 ml. of ethanol at 0° C. is added a solution of 5.4 g. of sodium methoxide in 60 ml. of methanol. The resulting mixture is stirred at room temperature for six hours, then cooled and the solid material is filtered off and dissolved in water. Dilute acetic acid is added. Extracting with ether and removing the ether from the extract gives 2-nitro-1-(p-trifluoromethylphenyl) propanol.

A mixture of 24.9 g. of the above prepared nitropropanol compound, 4.0 g. of lithium aluminum hydride and 350 ml. of tetrahydrofuran is stirred for two hours, then hydrolyzed by pouring into water. The mixture is made strongly alkaline with aqueous sodium hydroxide and the oil is extracted with chloroform. The extract is evaporated, in vacuo, to give α-(1-aminoethyl)-p-trifluoromethylbenzyl alcohol.

A mixture of 4.3 g. of 2-amino-1-(p-trifluoromethylphenyl)propanol, 2.1 g. of methyl iodide and 100 ml. of methanol is heated at reflux for 12 hours. The resulting mixture is evaporated to dryness, in vacuo. The residue is recrystallized from isopropanol, then dissolved in warm water. The solution is made alkaline with aqueous sodium hydroxide and then the organic solution is concentrated to give p-trifluoromethylephedrine.

1-methyl-4-piperidone (11.3 g.) is added to 23.3 g. of p-trifluoromethylephedrine in 250 ml. of benzene. Refluxing this mixture for five hours while removing water and then working up as in Example 1 gives 3,4,8-trimethyl-2-(p - trifluoromethylphenyl) - 1-oxa-4,8-diazaspiro[4.5] decane.

In the same manner, using p-cyanobenzaldehyde and 2-thiophenecarboxaldehyde in place of p-trifluoromethylbenzaldehyde the products are 2-(p-cyanophenyl)-3,4,8-trimethyl-1-oxa-4,8-diazaspiro[4.5]decane and 3,4,8-trimethyl-2-(2-thienyl)-1-oxa-4,8-diazaspiro[4.5]decane, respectively.

EXAMPLE 10

1-methyl-4-piperidone (11.3 g.) is added to 15.5 g. of α-(1-methylaminoethyl)furfuryl alcohol in 200 ml. of benzene. Heating this mixture at reflux with 0.5 ml. of methane sulfonic acid for three hours while removing water, then concentrating and distilling in vacuo gives 2 - (2 - furyl)-3,4,8-trimethyl-1-oxa-4,8-diazaspiro[4.5]decane.

In the above procedure, using 15.2 g. of α-(1-aminoethyl)-4-pyridinemethanol in place of α-(1-methylaminoethyl)-furfuryl alcohol the product is 3,8-dimethyl-2-(4 - pyridyl)-1-oxa-4,8-diazaspiro[4.5]decane. Similarly, using α-(1-aminoethyl)-3-piperidinemethanol and α-(1-aminopropyl)-2-pyridinemethanol the products are 3,8-dimethyl - 2-(3-pyridyl)-1-oxa-4,8-diazaspiro[4.5]decane and 3 - ethyl-8-methyl-2-(2-pyridyl)-1-oxa-4,8-diazaspiro[4.5]decane, respectively.

EXAMPLE 11

By the procedure of Example 3, using 11.3 g. of 1-methyl-4-piperidone and 16.7 g. of α-(1-aminoethyl)-m-hydroxybenzyl) alcohol the product is 2-(m-hydroxyphenyl(3,8-dimethyl-1-oxa-4,8-diazaspiro[4.5]decane.

What is claimed is:
1. A compound of the formula:

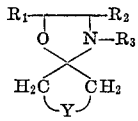

in which:
$R_1$ is phenyl, phenyl substituted by from one to two halo, hydroxy, lower alkyl or lower alkoxy substituents, trifluoromethylphenyl, cyanophenyl, methylenedioxphenyl, pyridyl, furyl or thienyl;
$R_2$ is lower alkyl;
$R_3$ is hydrogen or lower alkyl;
Y is a saturated three membered chain comprising two $CH_2$ members and one $N-R_4$ member, and
$R_4$ is lower alkyl or benzyl.

2. A compound according to claim 1 in which $R_1$ is phenyl, $R_2$ is methyl, $R_3$ is hydrogen and Y is

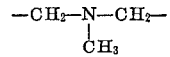

3. A compound according to claim 1 in which $R_1$ is m-hydroxyphenyl, $R_2$ is methyl, $R_3$ is hydrogen and Y is

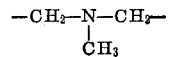

4. A compound according to claim 1 in which $R_1$ is 2,5-dimethoxyphenyl, $R_2$ is methyl, $R_3$ is hydrogen and Y is

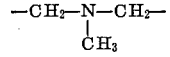

References Cited

Chemical Abstracts, vol. 64, 12679d, Science Union, April 1966.

HENRY R. JILES, Primary Examiner

S. D. WINTERS, Assistant Examiner

U.S. Cl. X.R.

260—293.4, 296, 297, 332.3, 340.5, 347.7, 347.8, 570.6, 618, 622, 999